US009422990B2

(12) United States Patent
McCrary

(10) Patent No.: US 9,422,990 B2
(45) Date of Patent: Aug. 23, 2016

(54) CLUTCH FOR LINKING AN INPUT SHAFT WITH A DRIVE MECHANISM AND METHODS OF COUPLING CONTROL USING THE SAME

(71) Applicant: Paul T. McCrary, Belleville, MI (US)

(72) Inventor: Paul T. McCrary, Belleville, MI (US)

(73) Assignee: DAYCO IP HOLDINGS, LLC, Troy, MI (US)

( * ) Notice: Subject to any disclaimer, the term of this patent is extended or adjusted under 35 U.S.C. 154(b) by 10 days.

(21) Appl. No.: 13/866,479

(22) Filed: Apr. 19, 2013

(65) Prior Publication Data

US 2013/0277166 A1 Oct. 24, 2013

Related U.S. Application Data

(60) Provisional application No. 61/636,636, filed on Apr. 21, 2012.

(51) Int. Cl.
*F16D 27/115* (2006.01)
*F16D 23/12* (2006.01)

(52) U.S. Cl.
CPC ........ *F16D 27/115* (2013.01); *F16D 2023/123* (2013.01)

(58) Field of Classification Search
CPC F16D 27/112; F16D 27/115; F16D 2023/123
USPC ............... 192/72.2, 84.7, 84.91, 84.96, 84.9, 192/70.23; 303/127, 122.15; 417/316; 188/163
See application file for complete search history.

(56) References Cited

U.S. PATENT DOCUMENTS

| | | | |
|---|---|---|---|
| 2,620,900 A * | 12/1952 | Du Rostu | 188/164 |
| 3,685,622 A | 8/1972 | Baer et al. | |
| 4,632,639 A | 12/1986 | Beaumont | |
| 4,657,127 A | 4/1987 | Boffelli | |
| 6,092,633 A | 7/2000 | Morisawa | |
| 6,446,772 B1 * | 9/2002 | Inose et al. | 192/35 |
| 6,568,520 B2 | 5/2003 | Hattori et al. | |
| 6,698,562 B2 | 3/2004 | Kato et al. | |
| 2002/0125096 A1 * | 9/2002 | Yamazaki et al. | 192/35 |
| 2004/0084979 A1 * | 5/2004 | Hughes et al. | 310/78 |
| 2007/0257552 A1 * | 11/2007 | Hehl, Sr. | 303/119.2 |
| 2013/0161150 A1 * | 6/2013 | McCrary | 192/41 R |

FOREIGN PATENT DOCUMENTS

| | | |
|---|---|---|
| JP | 2007-120618 | 5/2007 |
| JP | 2010-159856 | 7/2010 |

OTHER PUBLICATIONS

International Search Report and Written Opinion, International Application No. PCT/US2013/037389 (Aug. 22, 2013).

* cited by examiner

*Primary Examiner* — Richard Lorence
*Assistant Examiner* — Lillian Nguyen
(74) *Attorney, Agent, or Firm* — Thompson Hine LLP

(57) ABSTRACT

Drive devices for coupling a drive mechanism to an input shaft and methods of providing coupling control through an electromagnet are described herein. The drive devices include a driven member operatively coupled to a clutch assembly engageable with an input shaft. The clutch assembly includes an electromagnet, an actuator activated by the electromagnet, and a clutch pack that is biased into increased frictional engagement by the actuator to transfer the torque from the driven member to the input shaft. The methods include providing such a drive device and activating the electromagnet.

17 Claims, 3 Drawing Sheets

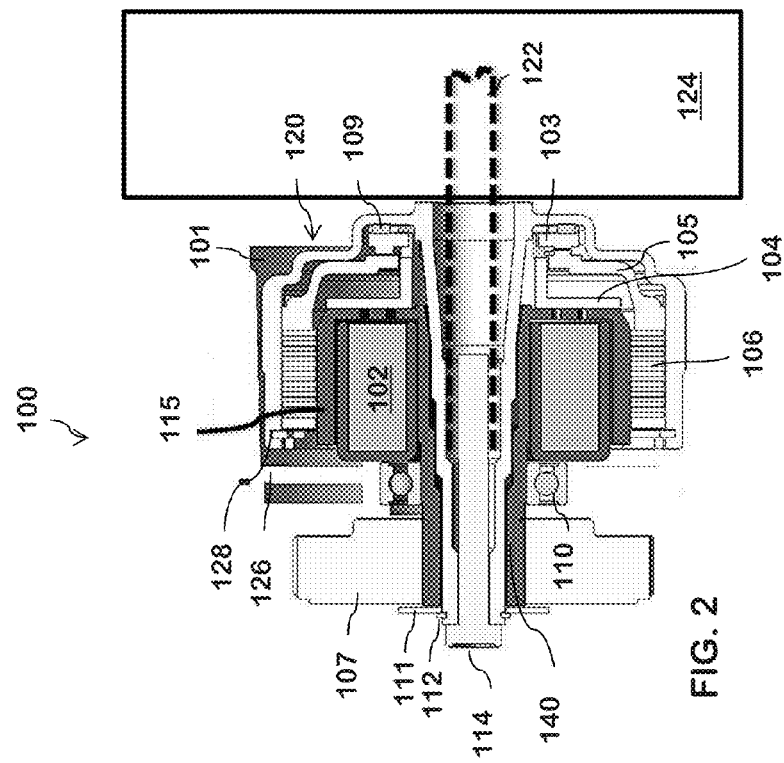
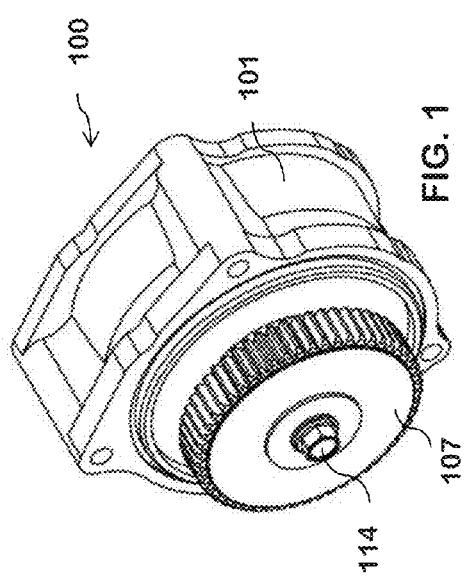

CLUTCH FOR LINKING AN INPUT SHAFT WITH A DRIVE MECHANISM AND METHODS OF COUPLING CONTROL USING THE SAME

RELATED REFERENCES

This application claims the benefit of U.S. Provisional Application No. 61/636,636, filed Apr. 21, 2012.

TECHNICAL FIELD

The present application relates generally to a clutch for linking a compressor with a drive means, in particular, an electromagnet and clutch pack assembly.

BACKGROUND

Some automotive vehicles include an air compressor drive system such as those related to air-actuated braking systems. In such systems, compressed air is usually fed to a reservoir and, as needed, the reservoir supplies air to the braking system for brake actuation. The air compressor is typically activated or driven by the internal combustion engine via a transmission, usually with gears, which maintains operating pressure in the pneumatic system or systems. However, when there is no consumption of air, for example for braking, usually an automatic valve discharges any excess pressure in the system. To avoid inefficiencies, and the need to discharge air (when the air compressor output exceeds the brake system and reservoir requirements), the compressor may include a clutch that disengages the compressor when the pressure in the pneumatic system is equal to the maximum desired value and, reconnecting it as soon as its activation becomes necessary to restore working pressure.

Current air compressors and the clutches therein provide for engagement and disengagement of the drive means and the compressor, but improvements are needed that out perform, last longer, and are more cost effective to manufacture.

SUMMARY

In a first aspect, drive devices for coupling a drive mechanism to an input shaft are disclosed. The drive devices include a driven member operatively coupled to a clutch assembly engageable with an input shaft. The clutch assembly includes an electromagnet, an actuator activated by the electromagnet, and a clutch pack that is biased into increased frictional engagement by the actuator to transfer the torque from the driven member to the input shaft. The methods include providing such a drive device and activating the electromagnet.

The actuator, in one embodiment, includes a rotor coupled to the driven member for rotation therewith, an armature rotatably coupled to a first plate, and a second plate rotatably coupled to the input shaft. The armature is axially translatable in response to activation and deactivation of the electromagnet. Activation moves the armature into a coupled relationship with the rotor for rotation therewith. The second plate is axially translatable relative to the first plate as the first plate rotates. During activation, the armature is rotatable with the rotor which results in the axial translation of the second plate, which moves members of the clutch pack into increased frictional engagement to transfer the torque from the driven member to the input shaft.

In another aspect, air compressor drive devices with improved clutch assemblies are disclosed that utilize torque-sensitive coupling and de-coupling to permit one-way relative motion between a driven gear (driven by the crankshaft of an internal combustion engine) and an input shaft of an air compressor. When the driven gear is driven in the predominant direction of rotation and an electromagnet is activated, the clutching mechanism of the drive device is engaged and transfers the rotation of the driven gear to the input shaft of the air compressor. When the electromagnet is de-activated, the internal clutching mechanism disengages and the input shaft from the driven gear, thereby permitting the driven gear to continue to rotate independently of the input shaft of the air compressor.

Accordingly, in another aspect, methods of providing coupling control through an electromagnet are disclosed. The methods include providing a drive device as disclosed herein and activating the electromagnet to activate the actuator such that the torque from the drive mechanism is transferred to the input shaft. Subsequently, the method may also include deactivating the electromagnet to uncouple the input shaft from the drive mechanism.

One objection of the air compressor drive device is to provide improved efficiency of the vehicle air compressor system (or other systems) by providing coupling control through an electromagnet.

Another object of the air compressor drive device is to provide a "soft" engagement of the clutch assembly, which reduces or eliminates vehicle disturbance at the point of compressor drive engagement/disengagement.

In one embodiment, the drive devices for coupling a drive mechanism to an input shaft and methods of providing coupling control through an electromagnet are described herein. The drive devices include a driven member operatively coupled to a clutch assembly engageable with an input shaft. The clutch assembly includes an electromagnet, an actuator activated by the electromagnet, and a clutch pack that is biased into increased frictional engagement by the actuator to transfer the torque from the driven member to the input shaft. The methods include providing such a drive device and activating the electromagnet.

Other advantages and features of the invention will be apparent from the following description of particular embodiments and from the claims.

BRIEF DESCRIPTION OF THE DRAWINGS

FIG. 1 is a perspective view of an assembled embodiment of an air compressor drive device.

FIG. 2 is a cross-section view of the air compressor drive device of FIG. 1.

DETAILED DESCRIPTION

Figure 3:
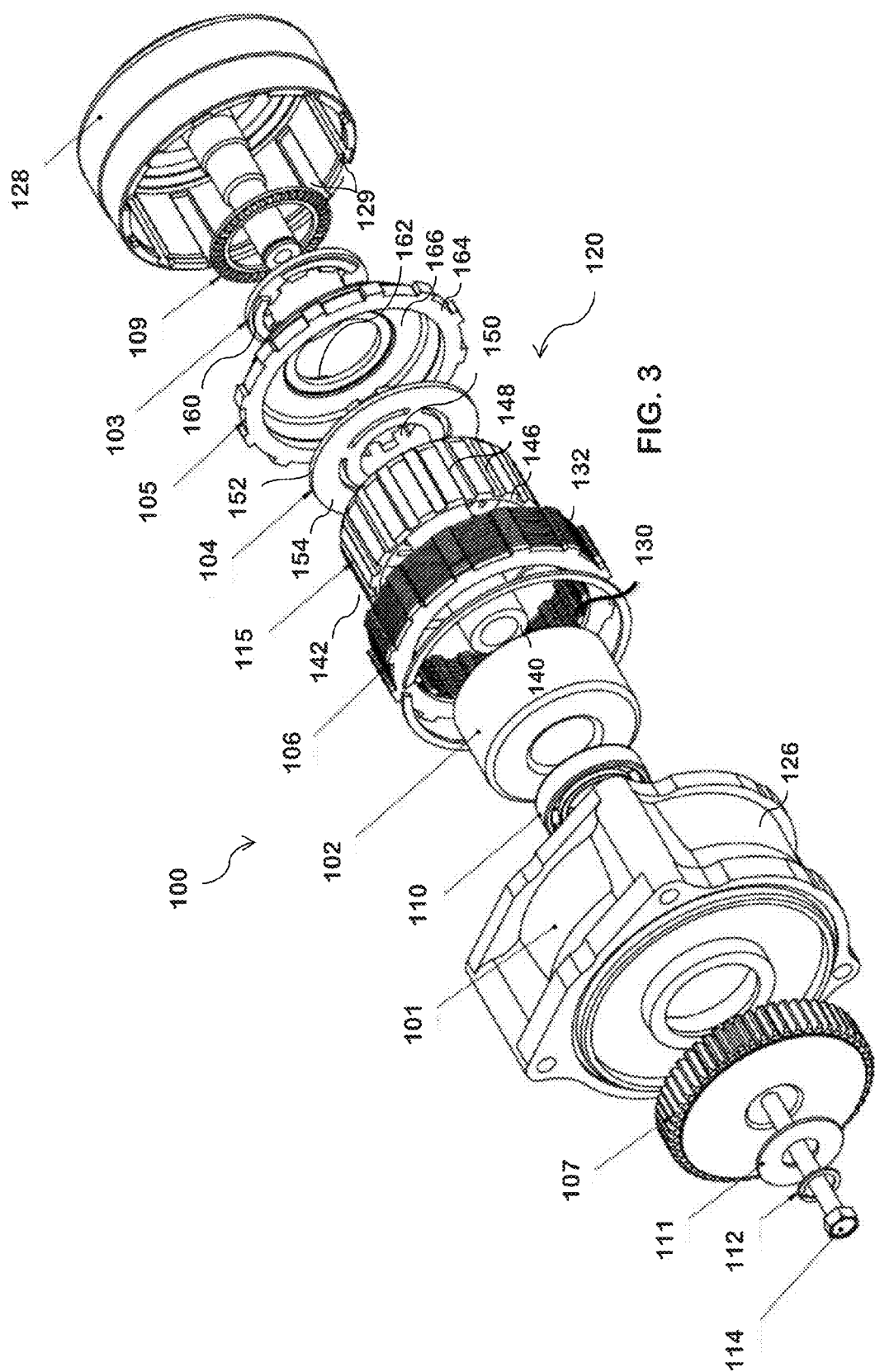
FIG. 3 is an exploded, perspective view of the air compressor drive device of FIG. 1.

The following detailed description will illustrate the general principles of the invention, examples of which are additionally illustrated in the accompanying drawings. In the drawings, like reference numbers indicate identical or functionally similar elements.

FIG. 1 is an illustration of a drive device, generally designated by reference number 100, for use with a drive mechanism (not shown), such as an internal combustion engine of a vehicle, to couple the drive mechanism to an input shaft or other such load input of a system such as an air compressor included as part of a vehicle's air brake system. The drive device 100 includes a housing 101 that houses a clutch assembly 120 (FIGS. 2 and 3) and has a driven gear 107 mounted to the exterior of the housing 101 by a fastener 114. The housing 101 includes an outer jacket 1267 and an inner casing 128 wherein the inner casing 128 nests within the outer jacket 126 as shown in FIG. 2. Within the vehicle, the housing 101 is fixedly mounted and the driven gear 107 is rotatable relative to the housing 101. The driven gear 107 may be coupled directly or indirectly to other gears (not shown), which are ultimately coupled to the crankshaft of the drive mechanism.

The fastener 114 may be a machine screw, bolt, or the like. In one embodiment, the machine screw has a keyed and tapered shaft that provides a connection, illustrated in FIG. 2, between the housing 101 and the input shaft of an air compressor 124. A washer 111 and snap ring 112 may be used with the fastener 114.

Referring to FIGS. 2 and 3, the clutch assembly 120 includes an electromagnet or coil 102, a clutch pack 106 of alternatively placed internally-splined plates 130 and externally-splined plates 132 (FIG. 3), a rotor 115, an armature 104, a first ramp plate 103 and a second ramp plate 105 having their respective ramp features 160 and 162 in an opposite-profiled mating relationship, and roller bearings 109, 110. The rotor 115 includes a central shaft 140 extending from a tub-shaped receptacle 142 configured to receive the electromagnet 102. Central shaft 140 even extends beyond the upper edge 146 of the tub-shaped receptacle 142.

As illustrated in FIG. 3, the internally-splined plates 130 and externally-splined plates 132 are rings having central openings that are large enough to be seated around (i.e., circumferentially surround) the tub-shaped receptacle 142 portion of the rotor 115. The exterior surface of the tub-shaped receptacle 142 includes a plurality of keyways 148 to receive the splines, individually, of the internally-splined plates 130, and the interior surface of the inner casing 128 includes a plurality of keyways 129 to receive the splines, individually, of the externally splined plates 132. Accordingly, the internally-splined plates 130 are rotatably connected to the rotor 115 for rotation therewith, and the externally-splined plates 132 are rotatably connected to the inner casing 128 for rotation therewith. This assembly provides a clutch pack 106 of interleaved plates 130 and 132 that are alternatively attached to input and output components. The internally-splined plates 130 and externally-splined plates 132, input and output respectively, are free to rotate relative to each other when the electromagnet 102 is de-energized, providing no compressor drive and, conversely, when the clutch is activated (the electromagnet is energized) are compressed together (acted upon axially by the second ramp plate) into frictional engagement and rotate together which connects the input and output components for rotation together.

The electromagnet 102 is attached to the outer jacket 126 and electrical power is supplied to the electromagnet 102 via wiring exiting through the outer jacket 126 (not shown). An energized coil or electromagnet 102 creates an electromagnetic field in the rotor 115 which attracts the armature 104 thereto and into contact with the bottom of its tub-shaped receptacle 142. The armature 104 includes a splined or keyed flange 150 extending out from a first surface 152. The first surface 152 is opposite the second surface 154, which is the surface attracted to and placed into contact with the bottom of the rotor 115 when the electromagnet 102 is energized.

Once the electromagnet 102 is energized and the armature 104 is attracted to the rotor 115, the armature 104 rotates with the rotor 115. The armature 104 through its splined flange 150 is keyed to the first ramp plate 103 for rotation together and, hence, rotation with the rotor 115 (in the energized state just described). This imparts a torque (from the driven gear 107) to the first ramp plate 103. The first ramp plate 103 is most proximate the inner bottom surface 170 of the inner casing 128, separated therefrom only by roller bearing 109. Because the first ramp plate 103 includes a ramp feature 160 in an opposite-profiled mating relationship with a mating ramp feature 162 of the second ramp plate 105, rotation of the first ramp plate 103 relative to the second ramp plate 105 causes the second ramp plate 105 to translate toward the rotor 115 as its mating ramp feature 162 slides along the ramp feature(s) 160 of the first ramp plate 103. Accordingly, the torque of the first ramp plate 103 (provided by driven gear 107) is converted to axial force affiliated with the translation of the second ramp plate 105.

The second ramp plate 105 is splined similarly to the externally-splined plates 132. The splines of the second ramp plate 105 are received in the keyways 129 of the inner casing 128 such that the second ramp plate is rotatable with the inner casing 128 and is also translatable (slidable along the axis of rotation) within the keyways 129, hence the second ramp plate 105 is able to translate as discussed above. The second ramp plate 105 includes a rim 164 that defines a cavity 166 in which the armature 104 is seatable. The armature 104 is also axially translatable within the cavity 166 in response to the activation and deactivation of the electromagnet 102. The rim 164 is configured to support the clutch pack 106, and when the second ramp plate 105 translates toward the rotor 115, an axial force is applied to the clutch pack 106 to clamp the alternating internally-splined plates 130 and externally-splined plates 132 together to enable torque transmission between the engine (via the driven gear 107) and the input shaft 122 (FIG. 2) of the air compressor 124. Once the second ramp plate 105 translates axially and clamps the clutch pack 106 the components of the clutch are engaged such that the rotatable components all rotate together in the predominant direction to rotate the input shaft 122.

When the air from the air compressor is no longer needed, the wiring connected to the electromagnet 102 is turned off and the electromagnet 102 is de-energized. As a result the armature 104 is no longer attracted to the rotor 115 and drops back to its seated positioned within the cavity 166. The natural relative rotation rates of the rotor 115 (imparted thereto by the driven gear) and the deceleration of the inner casing 128 will rotate the second ramp plate 105 relative to the first ramp plate 103 thereby sliding the mating ramp features 162 of the second ramp plate 105 along the ramp features 160 of the first ramp plate in a direction opposite the predominant direction to axially translate the second ramp plate 105 away from the rotor 115 and thereby removing the axial force acting on the clutch pack 106. The clutch is now unengaged.

In the embodiment illustrated in FIG. 3, the ramp features 160 are gradually sloping wedges or inclined planes protruding from the upper surface of the first ramp plate 103. As illustrated the wedges follow the curvature of the first ramp plate 103. There may be two or more ramp features 160. In one embodiment, three ramp features 160 may be preferred to provide stability to the plates.

Figure 4:
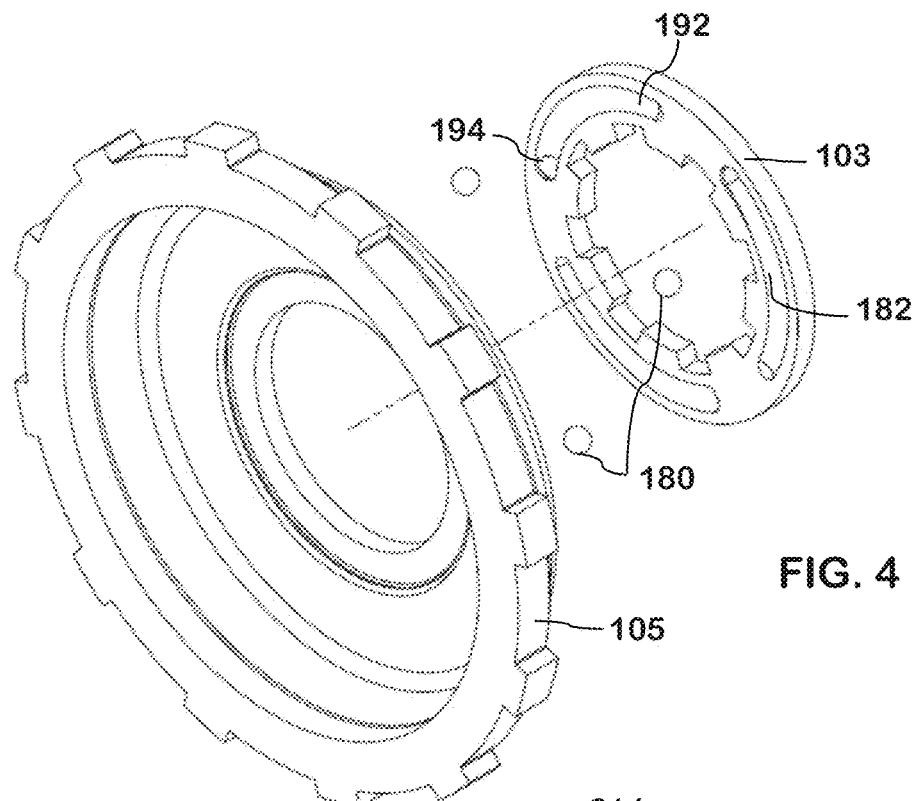
FIG. 4 is an exploded, perspective view of a second embodiment of a ramp-ramp assembly suitable for use in the air compressor drive device illustrated in FIG. 1.

In another embodiment, as shown in FIG. 4, the ramp features of the first and second ramp plates 103, 105 may be a roller-ramp construction that expands axially (i.e., has at least one component that is translatable along the axis of rotation to a location that is further from another component thereof) as a result of rotational movement of one of the ramp plates. The first ramp plate 103 and the second ramp plate 105 in this embodiment have one or more roller elements 180 enclosed therebetween. The roller elements 180 are seated within inclined features 182 recessed into the facing surfaces of the first and second ramp plates 103, 105. Each inclined features 182 defines a channel within which a roller element 180 may roll between a first end 192 that is shallow relative to a second end 194 (i.e., the second end is recessed more deeply into the surface of the ramp plate). For smooth angular displacement of the second ramp plate 104 as it translates (and rotation of roller elements 180) the channels are preferably smoothly, gradually tapering from the first end 192 to the second end 194. The inclined features 182 in the two ramp plates 103, 105 are opposite-profiled inclined features (the orientation of the first end 192 and second end 194 of the inclined features 182 is reversed relative to the orientation of the first and second end of the inclined feature of the second ramp plate 105). As described above, in one embodiment rotation of the first ramp plate 103 results in translation of the second ramp plate 105. The roller elements 180 may be cylinders, balls, generally conical cylinders, or the like.

Figure 5:
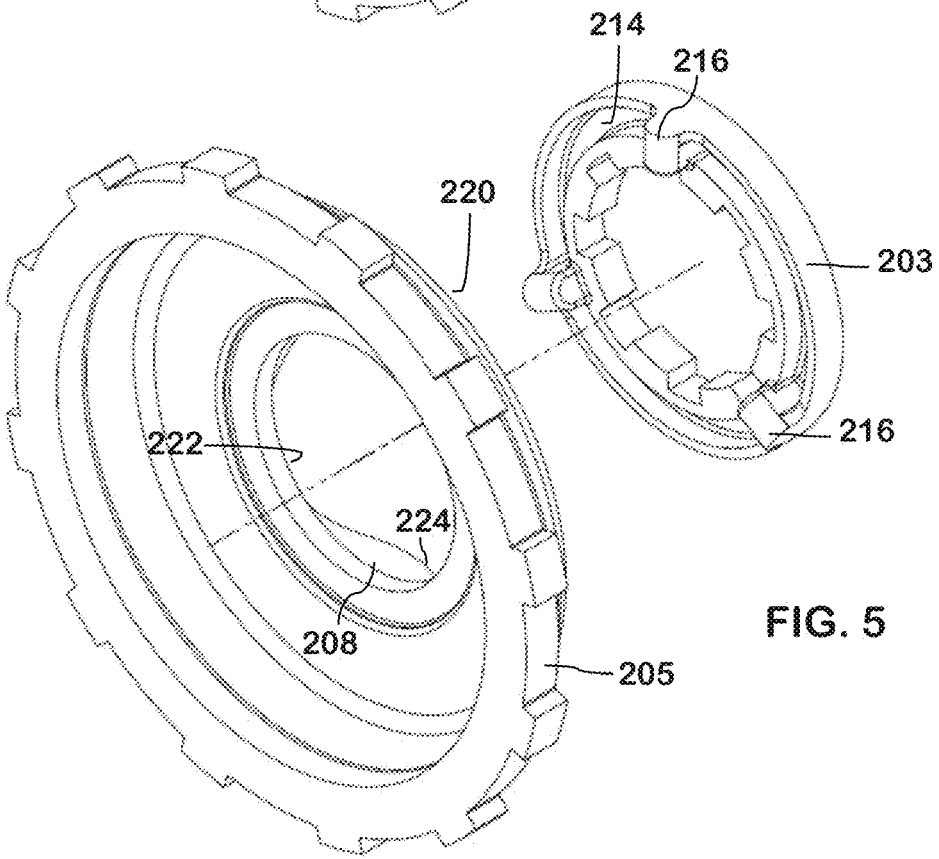
FIG. 5 is an exploded, perspective view of a third embodiment of a ramp-ramp assembly suitable for use in the air compressor drive device illustrated in FIG. 1.

In another embodiment, as shown in FIG. 5, the ramp features of the first and second ramp plates, now generally designated as 203 and 205, may be a cam-hurdle construction. The first ramp plate 203 includes a track or groove 214 that includes hurdles 216 spaced apart within the track 214. The hurdles 216 may have arcuate ends having sloped or inclined surfaces facing the cams 208 protruding from the second ramp plate 205 such that relative rotation between the first ramp plate 203 and the second ramp plate 205 produces axial displacement (translation) of the second ramp plate 205 toward the rotor 115 and the clutch pack 106 as described above, as a result of the contour of the cams 208 moving rotationally along the hurdles 216. Cams 208 include an upper surface 220 that is contoured to provide a camming action that results in the axial displacement of the second ramp plate 205 during rotation on at least one of the first and second ramp plates 203, 205. The contour may include alternating, or even undulating, valleys 222 and peaks 224. The valleys 222 of the contour are located opposite the hurdles 216 when the pulley assembly is in a rest position. Positive input from driven gear 107 through the rotor 115 (FIGS. 2 and 3) results in relative rotation in a positive sense of the first ramp plate 203 when the electromagnet 102 is energized. In practice the ramp slopes, profiles on the hurdles 216, and the contour of the upper surface 220 of the second ramp plate 205 may be different slopes or profiles.

One benefit of these ramp-ramp, roller-ramp, or cam-hurdle constructions to actuate the clutch assembly, in particular to compress the clutch pack, is that each provides the drive device 100 with isolation or damping capability.

As seen in FIG. 2, roller bearing 110 is disposed between the outer jacket 126 and the central shaft 140 of the rotor 115 to permit stable rotation of the rotor 115 relative to the outer jacket 126. The use of a roller bearing may improve the overall structural rigidity of the assembly and extend the life of the assembly by reducing wear as elements of the clutching mechanism rotate relative to one another.

In another embodiment, the clutch assembly 120 of FIG. 3 or any of the other embodiments may include a spring (not shown) to bias the armature 104 to return to its seated position within the second ramp plate 105. The spring may be a Belleville disc spring or wave spring, a coil spring, leaf spring, or the like. The spring may provide the benefit of controlled axial compliance, which if properly implemented, creates torsional isolation between the input and the output.

As described above, the clutch system is 'normally open', no electrical power (an unenergized electromagnet) provides no compressor drive. Alternatively, the clutch system may be a 'normally closed' system (not shown), no electrical power (an unenergized electromagnet) provides a compressor drive. The clutch pack 106 and ramp plates 103, 105 (or 203, 205) provide soft engagement of the clutch and therefore the compressor, which can be modulated by varying the number of plates in the clutch pack and/or their compositions (e.g., selecting various materials for the plates and/or varying coefficients of friction).

While splined connections are described and illustrated in the figures, the drive device 100 is not limited thereto. The drive device may include other coupling features configured to engage a mating coupling feature on another component of the clutch assembly 120 as long as such coupling features provide for rotation of one clutch component with another clutch component (i.e., transfer torque from one component to other component).

Various parameters can affect the operation, responsiveness, and performance of the drive devices disclosed herein, including the angle, slope, or profile ramp or camming surfaces, and the coefficient of friction between components in frictional engagement with one another. Other factors that affect the selection of a particular combination include wear, primary clutching, durability and cost.

In one aspect, the invention includes a drive device, for example to drive an air compressor, having a driven gear for coupling the drive device to an internal combustion engine, such as to its crankshaft, and an electromagnetic clutch. The clutch assembly includes an electromagnet seated within a rotor coupled to a driven gear for rotation therewith, an armature rotatably coupled to a first plate, the armature being translatable in response to the rotation of the first plate when it rotates with the armature, and a clutch pack comprising a plurality of plates that are compressible into frictional engagement with one another in response to the translation of the second plate to engage the clutch such that the clutch components rotate with the driven gear.

What is claimed is:
1. A drive device comprising:
   a driven member operatively coupled to a clutch assembly engageable with an input shaft, wherein the clutch assembly comprises:
   an electromagnet,
   an actuator activated by the electromagnet, the actuator comprising:
      a rotor coupled to the driven member for rotation therewith and housing the electromagnet;
      a first ramp plate having a first ramp feature;
      an armature having a flange keyed to the first ramp plate for rotation therewith, the armature being axially translatable in response to activation and deactivation of the electromagnet;
      a second ramp plate having a second ramp feature and being rotatably coupled to the input shaft and axially translatable relative to the first ramp plate in a direction toward the armature as the first ramp plate rotates;
      wherein the second ramp plate is positioned between the armature and the first ramp plate and the flange of the armature extends through an opening defined in the second ramp plate to be keyed to the first ramp plate; and
   a clutch pack seated about the exterior of the rotor with at least one first member rotatably connected to the rotor for rotation therewith and at least one second member rotatably connected to the input shaft;

wherein, when the actuator is activated, the armature is rotatable with the rotor which results in the axial translation of the second ramp plate, which biases the first and second members of the clutch pack into increased frictional engagement by the actuator to transfer the torque from the driven member to the input shaft.

2. The drive device of claim 1, wherein the first ramp feature and the second ramp feature are oppositely-profiled and in a mating relationship with one another.

3. The drive device of claim 2, wherein the first ramp feature and the second ramp feature are included planes.

4. The drive device of claim 2, wherein the first ramp plate and the second ramp plate have one or more roller elements disposed therebetween.

5. The drive device of claim 4, wherein the roller elements are seated in oppositely-profiled inclined features recessed into the first ramp plate and the second ramp plate.

6. The drive device of claim 2, wherein at least one of the first and second ramp features is a cam.

7. The drive device of claim 1, further comprising a housing enclosing the clutch assembly and having the driven member mounted thereto.

8. The drive device of claim 1, wherein the rotor includes a central shaft extending from a tub-shaped receptacle, and upon which the driven member is mounted.

9. The drive device of claim 1, wherein the input shaft is included in an air compressor in an air brake system and the driven member is a driven gear.

10. A method of providing coupling control through an electromagnet, the method comprising:
providing a driven member operatively coupled to a clutch assembly engageable with an input shaft, wherein the clutch assembly includes the electromagnet, an actuator activated by the electromagnet, and a clutch pack biased into increased frictional engagement by the actuator to transfer the torque from the driven member to the input shaft, wherein the actuator comprises:
a rotor coupled to the driven member for rotation therewith and housing the electromagnet;
an armature having a flange keyed to a first ramp plate for rotation therewith, the armature being axially translatable in response to activating and deactivating the electromagnet;
a second ramp plate defining an opening therethrough, positioned between the armature and the first ramp plate with the flange of the armature extending through the opening, and rotatably coupled to an input shaft and axially translatable relative to the first ramp plate in a direction toward the armature as the first ramp plate rotates; and
wherein the clutch pack is seated about the exterior of the rotor with at least one first member rotatably connected to the rotor for rotation therewith and at least one second member rotatably connected to the input shaft; and
activating the electromagnet when the driven member is rotated in a predominant direction and thereby linking the armature to the rotor for rotation therewith;
wherein rotation of the armature in the predominant direction results in axial translation of the second ramp plate, which moves the first and second members of the clutch pack into increased frictional engagement to link the input shaft to the driven member for rotation together in the predominant direction.

11. The method of claim 10, wherein the input shaft is included in an air compressor in an air brake system, and activating the electromagnet results in air being provided to the air brake system.

12. The method of claim 11, comprising, subsequent to the activating step, de-activating the electromagnet to stop the air being provided to the air brake system.

13. The method of claim 10, wherein the first ramp plate includes a first ramp feature and the second ramp plate includes a second ramp feature, wherein the first ramp feature and the second ramp feature are oppositely-profiled and in a mating relationship with one another.

14. The method of claim 13, wherein the first ramp feature and the second ramp feature are included planes.

15. The method of claim 13, wherein the first ramp plate and the second ramp plate have one or more roller elements disposed therebetween.

16. The method of claim 15, wherein the roller elements are seated in oppositely-profiled inclined features recessed into the first ramp plate and the second ramp plate.

17. The method of claim 10, wherein the first ramp plate includes a first ramp feature and the second ramp plate includes a second ramp feature, and at least one of the first and second ramp features is a cam.

\* \* \* \* \*